United States Patent
Miura et al.

(10) Patent No.: US 6,878,491 B1
(45) Date of Patent: Apr. 12, 2005

(54) SOLID POLYMER ELECTROLYTE AND USE THEREOF

(75) Inventors: Katsuhito Miura, Amagasaki (JP); Masanori Yanagida, Amagasaki (JP); Hiroki Higobashi, Amagasaki (JP); Shouhei Matsui, Amagasaki (JP)

(73) Assignee: Daiso Co., Ltd., Osaka (JP)

( * ) Notice: Subject to any disclaimer, the term of this patent is extended or adjusted under 35 U.S.C. 154(b) by 0 days.

(21) Appl. No.: 09/417,135

(22) Filed: Oct. 13, 1999

(30) Foreign Application Priority Data

Oct. 13, 1998  (JP) .......................................... 10-290626

(51) Int. Cl.$^7$ ............................................... H01M 6/18
(52) U.S. Cl. ..................... 429/309; 429/309; 429/310; 429/311; 429/312; 429/313
(58) Field of Search ................................ 429/303, 309, 429/306, 310, 311, 312, 313, 324, 326

(56) References Cited

U.S. PATENT DOCUMENTS

| | | |
|---|---|---|
| 3,297,783 A | 1/1967 | Bailey |
| 4,303,748 A | 12/1981 | Armand et al. |
| 4,578,326 A | 3/1986 | Armand et al. |
| 4,758,483 A | 7/1988 | Armand et al. |
| 4,818,644 A | 4/1989 | Armand |
| 4,822,701 A | 4/1989 | Ballard et al. |
| RE33,967 E | 6/1992 | Honda et al. |
| 5,162,174 A * | 11/1992 | Andrei et al. ................ 429/312 |
| 5,527,639 A * | 6/1996 | Noda et al. .................. 429/311 |
| 5,755,985 A * | 5/1998 | Vallee et al. ................ 252/62.2 |
| 5,968,681 A * | 10/1999 | Miura et al. ................. 429/122 |
| 6,159,389 A * | 12/2000 | Miura et al. ................. 252/62.2 |
| 6,162,563 A * | 12/2000 | Miura et al. ................. 429/309 |

FOREIGN PATENT DOCUMENTS

| | | |
|---|---|---|
| CA | 1269702 | 5/1990 |
| EP | 0 174 894 | 3/1986 |
| EP | 0222586 A2 | 11/1986 |
| EP | 0 222 586 | 5/1987 |
| EP | 0392839 A2 | 4/1990 |
| EP | 0 894 824 A1 | 10/1997 |
| EP | 0894824 | 2/1999 |
| FR | 0174894 A1 | 9/1985 |
| JP | 61-83249 | 4/1986 |
| JP | 62-169823 | 7/1987 |
| JP | 62-249361 | 10/1987 |
| JP | 63-136407 | 6/1988 |
| JP | 63-154736 | 6/1988 |
| JP | 2-24975 | 1/1990 |
| JP | 02-235957 | 9/1990 |
| JP | 02295004 | 12/1990 |
| JP | 02-295004 | 12/1990 |
| JP | 3-47833 | 2/1991 |
| JP | 03200864 | 9/1991 |
| JP | 03200865 | 9/1991 |
| JP | 04036347 | 2/1992 |
| JP | 04-068064 | 3/1992 |
| JP | 05304051 | 11/1993 |
| JP | 7206936 | 8/1995 |
| JP | A 7 296822 | 11/1995 |
| JP | 7 296822 | 11/1995 |
| JP | 07/324129 | 12/1995 |
| WO | WO97/39055 | 10/1997 |

OTHER PUBLICATIONS

Chen Li–Quan et al, "Effect of Some Factors on Conductivities of Polymer Ionic Conductors", ACTA PHYSICA SINICA, vol. 36, No. 1, Jan. 1987, pp. 60–66.
Chemical Abstracts, 116, No. 110012b (1992).
Chemical Abstracts, 114, No. 103407q (1991).
Chemical Abstracts, 125, No. 249230a (1996).
Ballad et al., "Ionic Conductivity in Organic Solids Derived from Amorphous Macromolecules," *American Chemical Society*, 23 (5) :1256–1264 (1990).
Kono et al., "Synthesis of Polymer Electrolytes Based on Poly [2– (2–methoxyethoxy) ethyl glycidyl ether] and Their High High Ionic Conductivity," *Polymers for Advanced Technologies*, 4:85–91 (1992).
Motogami et al., "A New Polymer Electrolyte Based On Polyglycidylether," *Electrochimica Acta*, 37 (9) :1725–1727 (1992).

\* cited by examiner

*Primary Examiner*—Patrick Ryan
*Assistant Examiner*—Julian Mercado
(74) *Attorney, Agent, or Firm*—Jacobson Holman PLLC

(57) ABSTRACT

A polyether copolymer having a weight-average molecular weight of $10^4$ to $10^7$, formed from 3 to 30% by mol of a repeating unit derived from propylene oxide, 96 to 69% by mol of a repeating unit derived from ethylene oxide, and 0.01 to 15% by mol of a crosslinkable repeating unit derived from a reactive oxirane compound, gives a provide a crosslinked solid polymer electrolyte which is superior in processability, moldability, mechanical strength, flexibility and heat resistance, and has markedly improved ionic conductivity.

15 Claims, No Drawings

SOLID POLYMER ELECTROLYTE AND USE THEREOF

FIELD OF THE INVENTION

The present invention relates to a crosslinkable polyether copolymer, a crosslinked material of said copolymer, and a crosslinked solid polymer electrolyte. More particularly, the present invention relates to a crosslinked solid polymer electrolyte which is suitable as a material for electrochemical devices such as battery, capacitor, sensor, condenser and EC (electrochromic) device, and a photoelectric transfer device.

RELATED ART

As an electrolyte constituting an electrochemical device such as a battery, a capacitor and a sensor, those in the form of a solution or a paste have hitherto been used in view of the ionic conductivity. However, the following problems are pointed out. That is, there is a fear of damage of an apparatus arising due to liquid leakage, the mounting and processability of the device are problematic, and subminiaturization and thinning of the device are limited because a separator to be impregnated with an electrolyte solution is required. To the contrary, a solid electrolyte such as inorganic crystalline substance, inorganic glass and organic polymer substance is suggested. The organic polymer substance is generally superior in processability and moldability and the resultant solid electrolyte has good flexibility and bending processability and, furthermore, the design freedom of the device to be applied is high and, therefore, the development thereof is expected. However, the organic polymer substance is inferior in ionic conductivity to other materials at present.

For example, an attempt that an ethylene oxide-propylene oxide copolymer containing a specific alkali metal salt is utilized as an ion conductive solid electrolyte has already been proposed (Japanese Patent Application Laid-Open Nos. Showa 61-83249 (83249/1986), Showa 63-136407 (136407/1988) and Heisei 2-24975 (24975/1990)). However, a polymeric substance having more improved ionic conductivity and mechanical properties are still desired. In order to achieve more prevalent application of a solid polymer electrolyte to electrochemical devices, a solid polymer electrolyte which has sufficient mechanical strength and flexibility is to be realized such that conduction and breakage of elements can be prevented.

The inventors of the present invention have discovered that a solid electrolyte having an excellent ionic conductivity and showing little plastic deformation or fluidity even at a high temperature can be obtained by using a multi-component copolymer in which propylene oxide and ethylene oxide are combined with a further crosslinkable oxirane compound and blending this multiomponent copolymer with an electrolyte salt compound before or after the crosslinking.

The present invention provides a polyether copolymer having a weight-average molecular weight of $10^5$ to $10^7$, which copolymer comprises: (A) 3 to 30% by mol of repeating unit derived from propylene oxide; (B) 96 to 69% by mol of repeating unit derived from ethylene oxide; and (C) 0.01 to 15% by mol of repeating unit derived from a monomer having one epoxy group and at least one reactive functional group represented by formula (III-1) and/or formula (III-2):

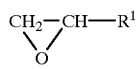

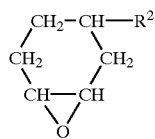

wherein $R^1$ and $R^2$ are groups each having a reactive functional group.

The present invention provides a crosslinked material in which said polyether copolymer is crosslinked.

The present invention provides a crosslinked solid polymer electrolyte comprising: (I) a crosslinked material of said polyether copolymer; (II) an electrolyte salt compound; and (III) a plasticizer, which may be added if necessary, selected from the group consisting of an aprotic organic solvent, a derivative or metal salt of linear or branched polyalkylene glycol, and a metal salt of said derivative.

The present invention also provides a battery comprising said solid polymer electrolyte.

The copolymer of the present invention has:
(A) repeating unit derived from propylene oxide;

(B) repeating unit derived from ethylene oxide; and

(C) repeating unit derived from a monomer represented by formula (III-1) or formula (III-2):

and/or

wherein $R^1$ and $R^2$ are groups each having a reactive functional group.

The crosslinked material of polyether polymer shows excellent shape stability at a high temperature.

When a plasticizer is mixed into a solid polymer electrolyte, the crystallization of the polymer is suppressed and the glass transition temperature is lowered, achieving a larger magnitude of formation of amorphous phase at a relatively low temperature and thus a higher ion conduction rate. It has been discovered that, when the crosslinked solid polymer electrolyte of the present invention is used, a high-performance battery having a small internal resistance can be obtained. The crosslinked solid polymer electrolyte of the present invention may be a gel. The "gel" means a polymer which has swollen due to absorption of a solvent.

The polymerization method for obtaining the polyether multi-component copolymer (referred to as the "polyether copolymer" hereinafter) used in the present invention is a polymerization method in which a copolymer is obtained by a ring-opening reaction in the ethylene oxide portion. An example of a polymerization method in which a copolymer is obtained by a ring-opening reaction in the ethylene oxide portion is described in Japanese Patent Application Laid-Open (JP-A) No. Showa 62-169823, and JP-A-7-324129.

Specifically, the polyether copolymer of the present invention can be obtained by reacting (A) propylene oxide, (B) ethylene oxide and (C) the crosslinkably reactive monomer with each other under the presence or absence of a solvent at a reaction temperature of 10 to 80° C. with stirring, using as a ring-opening polymerization catalyst a catalyst system mainly containing organic aluminum, a catalyst system mainly containing organic zinc, a catalyst system containing organotin-phosphoric ester condensates, and the like.

Particularly, in case where an oxirane compound having an epoxy group at only both ends is used, when using the organotin-phosphoric ester condensate catalyst, only an epoxy group which does not contain a substituent, i.e. methyl group is used in the polymerization reaction and, therefore, an epoxy group having a methyl group remains in the polymer without being reacted. The organotin-phosphoric ester condensate catalyst is particularly preferable in view of the polymerization degree, properties of the resultant copolymer, and the like.

As the polyether copolymer of the present invention used as a raw material for a crosslinked material, those comprising 3 to 30% by mol of the repeating unit (A), 96 to 69% by mol of the repeating unit (B) and 0.01 to 15% by mol of the repeating unit (C) are used. Those comprising 5 to 25% by mol, particularly 10 to 20% by mole of the repeating unit (A), 94 to 74% by mol, particularly 89 to 79% by mol, of the repeating unit (B) and 0.01 to 10% by mol, particularly 0.05 to 8% by mol, of the repeating unit (C) are preferred.

When the content of the repeating unit (B) exceeds 96% by mol, crystallization of the oxyethylene chain arise and diffusion transfer of carrier ions are lowered, which results in drastic deterioration of the ionic conductivity of the solid electrolyte. When the content of the repeating unit (B) is smaller than 69% by mol, dissociation capability of the salt is lowered, which results in deterioration of the ionic conductivity.

It is generally known that the ionic conductivity is improved by decrease in the crystallizability of polyethylene oxide and decrease in glass transition temperature. It has been found that, the effect for improvement of the ionic conductivity is remarkably large by an optimum balance of the monomeric composition of the polyether copolymer of the present invention.

When a molar ratio of the crosslinking monomer component (monomer capable of forming the repeating unit (C)) is larger than 15% by mol, the ionic conductivity is drastically lowered and the flexibility of a film is lost, thereby causing problems in processability and moldability.

The polyether copolymer of the present invention may be any of a block copolymer and a random copolymer. The random copolymer is preferred because of its large effect of lowering the crystallizability of polyethylene oxide.

Regarding the molecular weight of the polyether copolymer, the weight-average molecular weight is within a range from $10^5$ to $10^7$, and preferably from $5 \times 10^5$ to $5 \times 10^6$, so as to obtain excellent processability, moldability, mechanical strength and flexibility. When the weight-average molecular weight is smaller than $10^5$, it is necessary to increase the crosslink density to maintain the mechanical strength and to prevent flow at high temperature and, therefore, the ionic conductivity of the resultant electrolyte is lowered. On the other hand, when it exceeds $10^7$, problems arise in processability and moldability.

The repeating unit (A) is derived from propylene oxide. The repeating unit (B) is derived from ethylene oxide. The repeating unit (C) is derived from a monomer which has an epoxy group and a reactive functional group represented by the formula (III-1) or the formula (III-2).

The reactive functional group of the repeating unit (C) is preferably (a) an ethylenically unsaturated group, (b) a reactive silicon group, (c) an epoxy group or (d) a halogen atom.

The monomer having the ethylenically unsaturated group is preferably an oxirane compound represented by the formula (III-a):

(III-a)

wherein $R^3$ is a group having an ethylenically unsaturated group.

As the ethylenically unsaturated group-containing oxirane compound, there can be used allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2poxy-5-cyclooctene, glycidyl acrylate, glycidyl methacrylate, glycidyl sorbate, glycidyl cinnamate, glycidyl crotonate and glycidyl-4-hexenoate. Preferable examples thereof include allyl glycidyl ether, glycidyl acrylate and glycidyl methacrylate.

The monomer having a reactive silicon group, which constitutes the repeating unit (C), is preferably an oxirane compound represented by the formula (III-b-1):

(III-b-1)

wherein $R^4$ is a reactive silicon-containing group, or the formula (III-b-2):

(III-b-2)

wherein $R^5$ is a reactive silicon-containing group.

The reactive silicon group-containing oxirane compound represented by the formula (III-b-1) is preferably a compound represented by the formula (III-b-1-1) or (III-b-1-2).

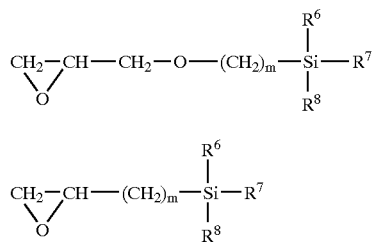

(III-b-1-1)

(III-b-1-2)

The reactive silicon group-containing monomer represented by the formula (III-b-2) is preferably a compound represented by the formula (III-b-2-1).

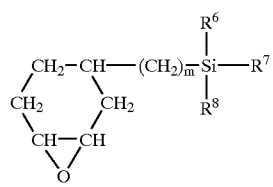

(III-b-2-1)

In the formulas (III-b-1-1), (III-b-1-2) and (III-b-2-1), $R^6$, $R^7$ and $R^8$ may be the same or different, but at least one of them represents an alkoxy group and the remainder represent an alkyl group; and m represents 1 to 6.

Examples of the monomer represented by the formula (III-b-1-1) include 2-glycidoxyethyltrimethoxysilane, 3-glycidoxypropylmethyldimethoxysilane, 3-glycidoxypropyltrimethoxysilane, 4-glycidoxybutylmethyl-dimethoxysilane and 4-glycidoxybutyltrimethoxysilane.

Examples of the monomer represented by the formula (III-b-1-2) include 3-(1,2-epoxy)propyltrimethoxysilane, 3-(1,2-epoxy)propylmethyldimethoxysilane, 3-(1,2-epoxy)propyldimethylmethoxysilane, 4-(1,2-epoxy)butyltrimethoxysilane, 4(1,2-epoxy)butylmethyldimethoxysilane, 5-(1,2-epoxy)pentyltrimethoxysilane, 5-(1,2-epoxy)pentylmethyldimethoxysilane, 6-(1,2-epoxy)hexyltrimethoxysilane and 6-(1,2-epoxy)hexylmethyldimethoxysilane.

Examples of the monomer represented by the formula (III-b-2-1) include 1-(3,4-epoxycyclohexyl)methyltrimethoxysilane, 1-(3,4-epoxycyclohexyl)methylmethyl-dimethoxysilane, 2-(3,4-epoxycyclohexyl)ethyltrimethoxysilane, 2-(3,4-epoxycyclohexyl)ethylmethyldimethoxysilane, 3-(3,4-epoxycyclohexyl)propyltrimethoxysilane, 3-(3,4-epoxycyclohexyl)propylmethyldimethoxysilane, 4-(3,4-epoxycyclohexyl)butyltrimethoxysilane and 4-(3,4-epoxycyclohexyl)butylmethyldimethoxysilane.

Among them, 3-glycidoxypropyltrimethoxysilane, 3-glycidoxypropyl-methyldimethoxysilane and 4-(1,2-epoxy)butyltrimethoxysilane are particularly preferable.

The monomer having the epoxy group as the reactive functional group, which constitutes the repeating unit (C), is preferably an oxirane compound having an epoxy group at both ends represented by the formula (III-c):

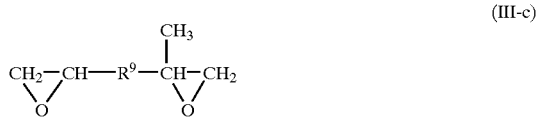

(III-c)

wherein $R_9$ is a divalent organic group. $R^9$ is preferably an organic group comprising elements selected from hydrogen, carbon and oxygen.

It is preferable that the group $R^9$ in the formula (III-c) is

—$CH_2$—O—($CHA^1$—$CHA^2$—O$)_p$—$CH_2$—,

—$(CH_2)_p$—, or

—$CH_2$O—Ph—$OCH_2$— wherein $A^1$ and $A^2$ represent hydrogen or a methyl group; Ph represents a phenylene group; and p represents a numeral of 0 to 12.

The monomer having two epoxy groups at both ends is preferably a compound represented by the following formula (III-c-1), (III-c-2) or (III-c-3):

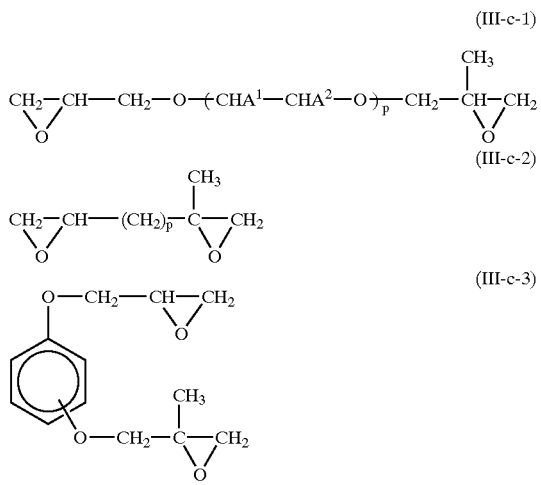

In the above formulas (III-c-1), (III-c-2) and (III-c-3), $A^1$ and $A^2$ represent hydrogen or a methyl group; and p represents a numeral of 0 to 12.

Examples of the monomer represented by the formula (III-c-1) include 2,3-epoxypropyl-2',3'-epoxy-2'-methyl propyl ether, ethylene glycol-2,3-epoxypropyl-2',3'-epoxy-2'-methyl propyl ether, and diethylene glycol-2,3-epoxypropyl-2',3'-epoxy-2'-methyl propyl ether. Examples of the monomer represented by the formula (III-c-2) include 2-methyl-1,2,3,4-diepoxybutane, 2-methyl-1,2,4,5-diepoxypenatane, and 2-methyl-1,2,5,6-diepoxyhexane. Examples of the monomer represented by the formula (III-c-3) include hydroquinone-2,3-epoxypropyl-2',3'-epoxy-2'-methyl propyl ether, and catechol-2,3-epoxypropyl-2',3'-epoxy-2'-methyl propyl ether.

Among them, 2,3-epoxypropyl-2',3'-epoxy-2'-methyl propyl ether and ethylene glycol-2,3-epoxypropyl-2',3'-epoxy-2'-methyl propyl ether are particularly preferable.

The monomer having a halogen atom is preferably an oxirane compound represented by formula (III-d):

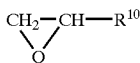

(III-d)

wherein $R^{10}$ is a group having a halogen atom.

The oxirane compound having a halogen atom includes epichlorohydrin, epibromohydrin and epiiodohydrin.

In the crosslinking method of the copolymer wherein the reactive functional group is ethylenically unsaturated group, a radical initiator selected from an organic peroxide and an azo compound, or active energy ray such as ultraviolet ray and electron ray can be used. It is also possible to use a crosslinking agent having a silicon hydride.

As the organic peroxide, there can be used those which are normally used in the crosslinking, such as a ketone peroxide, a peroxy ketal, a hydroperoxide, a dialkyl peroxide, a diacyl peroxide and a peroxy ester. Specific examples of the organic peroxide include 1,1-bis(t-butylperoxy)-3,3,5-trimethylcyclohexane, di-t-butyl peroxide, t-butylcumyl peroxide, dicumyl peroxide, 2,5-dimethyl-2,5-di(t-butylperoxy)hexane and benzoylperoxide. The amount of the organic peroxide varies depending on the type of the organic peroxide, but it is normally within the range from 0.1 to 10% by weight based on the whole composition constituting the solid polymer electrolyte and excluding the plasticizer.

As the azo compound, there can be used those which are normally used in the crosslinking, such as an azonitrile compound, an azoamide compound and an azoamidine compound. Specific examples of the azo compound include 2,2'-azobisisobutyronitrile, 2,2'-azobis(2-methylbutyronitrile), 2,2'-azobis(4-methoxy-2,4-dimethylvaleronitrile), 2,2-azobis(2-methyl-N-phenylpropionamidine)dihydrochloride, 2,2'-azobis[2-(2-imidazolin-2-yl)propane], 2,2'-azobis[2-methyl-N-(2-hydroxyethyl)propionamide], 2,2'-azobis(2-methylpropane) and 2,2'-azobis [2-(hydroxymethyl)propionitrile]. The amount of the azo compound varies depending on the type of the azo compound, but is normally within the range from 0.1 to 10% by weight based on the whole composition constituting the polymer solid electrolyte and excluding the plasticizer.

Particularly preferable examples of the monomer suitable for the crosslinking by active energy ray such as ultraviolet ray include glycidyl acrylate ester, glycidyl methacrylate ester and glycidyl cinnamate ester. Furthermore, as the auxiliary sensitizer, there can be optionally used acetophenones such as diethoxyacetophenone, 2-hydroxy-2-methyl-1-phenylpropan-1-one and phenylketone; benzoin ethers such as benzoin and benzoin methyl ether; benzophenones such as benzophenone and 4-phenylbenzophenone; thioxanthonies such as 2-isopropylthioxanthone and 2,4-dimethylthioxanthone; and azides such as azidopyrene, 3-sulfonylazidobenzoic acid and 4-sulfonylazidobenzoic acid.

As a crosslinking aid, there can be optionally used ethylene glycol diacrylate, ethylene glycol dimethacrylate, oligoethylene glycol diacrylate, oligoethylene glycol dimethacrylate, allyl methacrylate, allyl acrylate, diallyl maleate, triallyl isocyanurate, maleimide, phenylmaleimide and maleic anhydride.

As a crosslinking agent having a silicon hydride group, which is used for crosslinking the ethylenically unsaturated group, a compound having at least two silicon hydride groups can be used. Particularly, a polysiloxane compound or a polysilane compound is preferable.

Examples of the polysiloxane compound include a linear polysiloxane compound represented by the formula (a-1) or (a-2), or a cyclic polysiloxane compound represented by the formula (a-3).

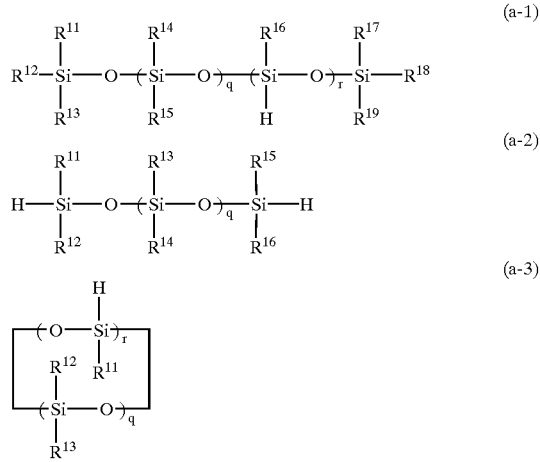

In the formulas (a-1) to (a-3), $R^{11}$, $R^{12}$, $R^{13}$, $R^{14}$, $R^{15}$, $R^{16}$, $R^{17}$, $R^{18}$ and $R^{19}$ respectively represent a hydrogen atom or an alkyl or alkoxy group having 1 to 12 carbon atoms; and q and r are an integer provided that $r \geq 2$, $q \geq 0$, $2 \leq q+r \leq 300$. As the alkyl group, a lower alkyl group such as a methyl group and an ethyl group is preferable. As the alkoxy group, a lower alkoxy group such as a methoxy group and an ethoxy group is preferable.

As the polysilane compound, a linear polysilane compound represented by the formula (b-1) can be used.

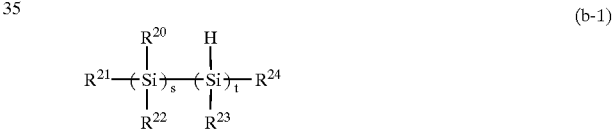

In the formula (b-1), $R^{20}$, $R^{21}$, $R^{22}$, $R^{23}$ and $R^{24}$ respectively represent a hydrogen atom or an alkyl or alkoxy group having 1 to 12 carbon atoms; and s and t are an integer provided that $t \geq 2$, $s \geq 0$, $2 \leq s+t \leq 100$.

Examples of the catalyst of the hydrosilylation reaction include transition metals such as palladium and platinum or a compound or complex thereof. Furthermore, peroxide, amine and phosphine can also be used. The most popular catalyst includes dichlorobis(acetonitrile)palladium(II), chlorotris(triphenyl-phosphine)rhodium(I) and chloroplatinic acid.

In the crosslinking method of the copolymer wherein the reactive functional group is a reactive silicon group, the crosslinking can be conducted by the reaction between the reactive silicon group and water. In order to increase the reactivity, there may be used, as a catalyst, organometal compounds, for example, tin compounds such as dibutyltin dilaurate, dibutyltin maleate, dibutyltin diacetate, tin octylate and dibutyltin acetylacetonate; titanium compounds such as tetrabutyl titanate and tetrapropyl titanate; aluminum compounds such as aluminum trisacetyl acetonate, aluminum trisethyl acetoacetate and diisopropoxyaluminum ethylacetoacetate; or amine compounds such as butylamine, octylamine, laurylamine, dibutylamine, monoethanolamine, diethanolamine, triethanolamine, diethylenetriamine, trietylenetetraamine, cyclohexylamine, benzylamine, diethylaminopropylamine, guanine and diphenylguanine.

In the crosslinking method of the copolymer wherein the reactive functional group is an epoxy group, polyamines, acid anhydrides and the like can be used.

Examples of the polyamines include aliphatic polyamines such as diethylenetriamine, dipropylenetriamine, triethylenetetramine, tetraethylenepentamine, dimethylaminopropylamine, diethylaminopropylamine, dibutylaminopropylamine, hexamethylenediamine, N-aminoethylpiperazine, bis-aminopropylpiperazine, trimethylhexamethylenediamine and dihydrazide isophthalate; and aromatic polyamines such as 4,4'-diaminodiphenyl ether, diaminodiphenyl sulfone, m-phenylenediamine, 2,4-toluylenediamine, m-toluylenediamine, o-toluylenediamine and xylylenediamine. The amount of the polyamine varies depending on the type of the polyamine, but is normally within the range from 0.1 to 10% by weight based on the whole composition constituting the solid polymer electrolyte and excluding the plasticizer.

Examples of the acid anhydrides includes maleic anhydride, dodecenylsuccinic anhydride, chlorendic anhydride, phthalic anhydride, pyromellitic anhydride, hexahydrophthalic anhydride, methylhexahydrophthalic anhydride, tetramethylenemaleic anhydride, tetrahydrophthalic anhydride, methyltetrahydrophthalic anhydride and trimellitic anhydride. The amount of the acid anhydrides varies depending on the type of the acid anhydride, but is normally within the range from 0.1 to 10% by weight based on the whole composition constituting the solid polymer electrolyte and excluding the plasticizer. In the crosslinking, an accelerator can be used. In the crosslinking reaction of polyamines, examples of the accelerator include phenol, cresol, resorcin, pyrogallol, nonyl phenol and 2,4,6-tris(dimethylaminomethyl)phenol. In the crosslinking reaction of the acid anhydride, examples of the accelerator include benzyldimethylamine, 2,4,6-tris(dimethylaminomethyl) phenol, 2-(dimethylaminoethyl)phenol, dimethylaniline and 2-ethyl-4-methylimidazole. The amount of the accelerator varies depending on the type of the accelerator, but is normally within the range from 0.1 to 10% by weight based on the crosslinking agent.

In the crosslinking method for crosslinking the copolymer containing a halogen atom, a crosslinking agent such as a polyamine, a mercaptoimidazoline, a mercaptopyrimidine, a thiourea, a polymercaptan or the like can be used. Examples of the polyamine include triethylenetetramine and hexamethylenediamine. Examples of the mercaptoimidazoline include 2-mercaptoimidazoline and 4-methyl-2-mercaptoimidazoline. Examples of the mercaptopyrimidine include 2-mercaptopyrimidine and 4,6-dimethyl-2-mercaptopyrimidine. Examples of the thiourea include ethylenethiourea and dibutylthiourea. Examples of the polymercaptan include 2-dibutylamino-4,6-dimethylcapto-s-triazine and 2-phenylamino-4,6-dimercaptotriazine. The amount of the crosslinking agent to be added may vary depending on the type of the crosslinking agent, but is normally within the range of 0.1 to 30% by weight based on the whole composition constituting the solid polymer electrolyte and excluding the plasticizer.

The electrolyte salt compound used in the present invention is preferably soluble in the polyether copolymer or in the crosslinked material of the polyether copolymer. In the present invention, the following electrolyte salt compounds are preferably used.

That is, examples thereof include a compound composed of a cation selected from metal cation, ammonium ion, amidinium ion and guanidium ion, and an anion selected from chloride ion, bromide ion, iodide ion, perchlorate ion, thiocyanate ion, tetrafluoroborate ion, nitrate ion, $AsF_6^+$, $PF_6^+$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $X^1SO_3^+$, $[(X^1SO_2)(X^2SO_2)N]^+$, $[(X^1SO_2)(X^2SO_2)(X^3SO_2)C]^+$ and $[(X^1SO_2)(X^2SO_2)YC]^+$, wherein $X^1$, $X^2$, $X^3$ and Y respectively represent an electron attractive group. Preferably, $X^1$, $X^2$ and $X^3$ independently represent a perfluoroalkyl having 1 to 6 carbon atoms or a perfluoroaryl group and Y represents a nitro group, a nitroso group, a carboriyl group, a carboxyl group or a cyano group. $X^1$, $X^2$ and $X^3$ may be the same or different.

As the metal cation, a cation of a transition metal can be used. Preferably, a cation of a metal selected from Mn, Fe, Co, Ni; Cu, Zn and Ag metals is used. When using a cation of a metal selected from Li, Na, K, Rb, Cs, Mg, Ca and Ba metals, good results are also obtained. Two or more compounds described above may be used as the electrolyte salt compound.

In the present invention, the amount of the electrolyte salt compound is so that a numeral value of a molar ratio of the number of moles of the electrolyte salt compound to the total number of moles of ether oxygen atom in the main and side chains of the polyether copolymer (the total number of moles of ether oxygen atom included in the polyether copolymer) is preferably within the range from 0.0001 to 5, more preferably from 0.001 to 0.5. When this value exceeds 5, the processability and moldability, the mechanical strength, flexibility and ionic conductivity of the resultant solid electrolyte are deteriorated.

The plasticizer may be selected from the group consisting of an aprotic organic solvent, a derivative or metal salt of linear or branched polyalkylene glycol, and a metal salt of said derivative.

The aprotic organic solvent is preferably an aprotic ether or ester. Specific examples thereof include propylene carbonate, γ-butyrolactone, butylene carbonate, ethylene carbonate, dimethyl carbonate, ethylmethyl carbonate, diethyl carbonate, 1,2-dimethoxyethane, 1,2-dimethoxypropane, 3-methyl-2-oxazolidone, tetrahydrofuran, 2-methyltetrahydroflran, 1,3-dioxolane, 4-methyl-1,3-dioxolane, tert-butyl ether, iso-butyl ether, 1,2-ethoxymethoxy ethane, ethylene glycol dimethyl ether, ethylene glycol diethyl ether, triethylene glycol dimethyl ether, triethylene glycol diethyl ether, tetraethylene glycol dimethyl ether, tetraethylene glycol diethyl ether, ethylene glyme, ehylene diglyme, methyl tetraglyme, methyl triglyme, methyl diglyme, methyl formate, methyl acetate and methyl propionate. Two or more of the aprotic organic solvent may be used in combination.

Among the aforementioned examples, propylene carbonate, γ-butyrolactone, butylene carbonate and 3-methyl-2-oxazoline are especially preferable. Triethylene glycol dimethyl ether, triethylene glycol diethyl ether, tetraethylene glycol dimethyl ether and tetraethylene glycol diethyl ether are also especially preferable as the organic solvent.

The derivative or the metal salt of linear or branched polyalkylene glycol (or a metal salt of said derivative) can be obtained from a polyalkylene glycol having a number-average molecular weight of 200 to 5,000. Examples of the polyalkylene glycol include polyethylene glycol and polypropylene glycol. Examples of the derivatives thereof include an ester derivative and an ether derivative having an alkyl group having 1 to 8 carbon atoms or an alkenyl group containing 3 to 8 carbon atoms.

Among the derivatives, examples of the ether derivative include a diether such as dimethyl ether, diethyl ether, dipropyl ether and diallyl ether. Examples of the ester derivative include a diester such as a polyalkylene glycol dimethacrylate ester (e.g. polyethylene glycol dimethacrylate ester), a polyalkylene glycol diacetate ester (e.g. polyethylene glycol diacetate ester), and a polyalkylene glycol diacrylate ester (e.g. polyethylene glycol diacrylate ester).

Examples of the metal salt include sodium, lithium, dialkyl aluminum salts of polyalkylene glycol.

Specific examples of the metal salt of the derivative include: sodium, lithium, dialkyl aluminum salts (e.g. dioctyl aluminum salt) of monoethers such as monomethyl ether, monoethyl ether, monopropyl ether, monobutyl ether, mondhexyl ether, mono-2-ethyl-hexyl ether, and monoallyl ether; and sodium, lithium, dialkyl aluminum salts of monoesters such as monoacetate ester, monoacrylate ester and monomethacrylate ester. Examples of the metal salt of the polyalkylene glycol derivative include dioctyl aluminum salt of polyethylene glycol monomethyl ether, dioctyl aluminum salt of polyethylene glycol monoethyl ether, and dioctyl aluminum salt of polyethylene glycol monoallyl ether.

The especially preferable range of the number average molecular weight of the polyalkylene glycol used is from 200 to 2,000.

The blending ratio of the plasticizer may be changed as desired. The plasticizer in an amount of 0 to 2,000 parts by weight, preferably 1 to 2,000 parts by weight, for example 10 to 1,000 parts by weight, particularly 10 to 500 parts by weight may be added to 100 parts by weight of the polyether copolymer.

When the flame retardancy is required in using the polyether copolymer, the crosslinked material thereof and the solid polymer electrolyte, a flame retardant can be used. That is, an effective amount of those selected from a halide (such as a brominated epoxy compound, tetrabromobisphenol A and chlorinated paraffin), antimony trioxide, antimony pentaoxide, aluminum hydroxide, magnesium hydroxide, phosphate ester, polyphosphate salt and zinc borate as a flame retardant can be added.

The method for production of the crosslinked solid polymer electrolyte of the present invention is not specifically limited, but the crosslinked solid polymer electrolyte is normally produced by a method of mechanically mixing a polyether copolymer with an electrolyte salt compound or mixing after dissolving them in a solvent, removing the solvent, and crosslinking, or a method of crosslinking a polyether copolymer and mechanically mixing the crosslinked polyether copolymer with an electrolyte salt compound or mixing after dissolving them in a solvent and removing the solvent. As a means for mechanically mixing, various kneaders, open rolls, extruders, etc. can be optionally used. In case of producing the crosslinked solid polymer electrolyte by using the solvent, various polar solvents such as tetrahydrofuran, acetone, acetonitrile, dimethyl formamide, dimethyl sulfoxide, dioxane, methyl ethyl ketone, methyl isobutyl ketone, toluene and ethylene glycol diethyl ether may be used alone or in combination thereof The concentration of the solution is preferably from 1 to 50% by weight, but is not limited thereto.

When the copolymer having an ethylenically unsaturated group is crosslinked by using a radical initiator, the crosslinking reaction is completed at the temperature range of 10 to 200° C. within 1 minute to 20 hours. When using energy radiation such as ultraviolet radiation, a sensitizer is normally used. The crosslinking reaction is normally completed at the temperature range of 10 to 150° C. within 0.1 second to 1 hour. In case of the crosslinking agent having silicon hydride, the crosslinking reaction can be completed at the temperature of 10 to 180° C. within 10 minutes to 10 hours.

In case that the reactive functional group is a reactive silicon group, the amount of water used in the crosslinking reaction is not specifically limited because the crosslinking reaction easily occurs even in the presence of moisture in the atmosphere. The crosslinking can also be conducted by passing through a cold water or hot water bath for a short time, or exposing to a steam atmosphere.

When using a polyamine or an acid anhydride in the crosslinking reaction of the copolymer having an epoxy group, the crosslinking reaction is completed at the temperature of 10 to 200° C. within 10 minutes to 20 hours.

The copolymer and crosslinked material of said copolymer shown in the present invention become a precursor useful as a crosslinked solid polymer electrolyte. The solid polymer electrolyte shown in the present invention is superior in mechanical strength and flexibility, and a large area thin-film shaped solid electrolyte can be easily obtained by utilizing the properties. For example, it is possible to make a battery comprising the solid polymer electrolyte of the present invention. In this case, examples of the positive electrode material include lithium-manganese double oxide, lithium-vanadium double oxide, lithium cobaltate, lithium nickelate, cobalt-substituted lithium nickelate, vanadium pentaoxide, polyacene, polypyrene, polyaniline, polyphenylene, polyphenylene sulfide, polyphenylene oxide, polypyrrole, polyfuran, and polyazulene. Examples of the negative electrode material include an interlaminar compound prepared by occlusion of lithium between graphite or carbon layers, a lithium metal and a lithium-lead alloy. By utilizing the high ionic conductivity, the crosslinked solid polymer electrolyte can also be used as a diaphragm of an ion electrode of the cation such as alkaline metal ion, Cu ion, Ca ion and Mg ion.

The solid polymer electrolyte of the present invention is especially suitable as a material for electrochemical device (e.g. a battery, a capacitor and a sensor).

PREFERRED EMBODIMENTS OF THE INVENTION

The following Examples further illustrate the present invention in detail. Preparation Example (production of catalyst).

Tributyltin chloride (10 g) and tributyl phosphate (35 g) were charged in a three-necked flask equipped with a stirrer, a thermometer and a distillation device, and the mixture was heated at 250° C. for 20 minutes with stirring under nitrogen stream and the distillate was distilled off to obtain a solid condensate as a residue product. In the following polymerization, this condensate was used as a polymerization catalyst.

The monomeric composition of the polyether copolymer was obtained by using the element analysis, the iodine value and the $^1$H NMR spectrum. A gel permeation chromatography measurement was carried out for measuring the molecular weight of the polyether copolymer. The molecular weight of the polyether copolymer was calculated in terms of the standard polystyrene. The gel permeation chromatography measurement was carried out at 60° C. in DMF as the solvent, using the measuring device (RID-6A) manufactured by Shimadzu Corporation and the columns (Showdex KD-807, KD-806, KD-806M and KD-803) manufactured by Showa Denko K.K.

The glass transition temperature and the heat of fusion were measured, using the differential scanning calorimeter DSC 8230B manufactured by Rigaku Denki K.K., in nitrogen atmosphere and in the temperature range of −100 to 80° C. at a temperature rise rate of 10° C./min. The measurement of conductivity σ was carried out by first pinching with platinum electrodes a film which had been vacuum-dried for 72 hours at 30° C. under a pressure of at most 1 mmHg and then applying a voltage of 0.5 V and a frequency range of 5 Hz to 13 MHz according to the alternating current method. The conductivity σ was calculated according to a complex impedance method. The flexibility of the solid electrolyte film was evaluated by the presence or absence of breakage when the film having a thickness of 1 mm was bent by 180 degrees at 25° C.

EXAMPLE 1

After the atmosphere in a four-necked glass flask (internal volume: 1 L) was replaced by nitrogen, the condensate (300 mg) obtained in the Preparation Example of the catalyst as the catalyst, allyl glycidyl ether (11 g) having a water content adjusted to not more than 10 ppm, propylene oxide (51 g) and n-hexane (500 g) as the solvent were charged in the flask, and ethylene oxide (100 g) was gradually added with monitoring the polymerization degree of propylene oxide by gas chromatography. The polymerization reaction was terminated by using methanol. The polymer was isolated by decantation, dried at 40° C. under a normal pressure for 24 hours, and then dried at 45° C. under reduced pressure for 10 hours to give 154 g of a polymer.

The glass transition temperature of this copolymer was −69° C., the weight-average molecular weight was 1,100,000 and the heat of fusion was 5 J/g. The component of propylene oxide was determined by the measurement of NMR spectrum, whereas the component of allyl glycidyl ether was determined by the measurement of the iodine value. The results of the composition analysis (in terms of monomers) are as shown in Table 1.

The resultant copolymer (1 g) and dicumyl peroxide (0.015 g) as a crosslinking agent were dissolved in acetonitrile (5 ml), and the resultant solution was mixed with lithium perchlorate (electrolyte salt compound) so that a molar ratio of (the number of moles of the electrolyte salt compound to the total number of moles of ether oxygen atoms of copolymer) was 0.05. This mixture solution was cast on a mold made of polytetrafluoroethylene, followed by sufficient drying and further heating under a nitrogen atmosphere at 150° C. for 3 hours to give a film. The measurement results of the conductivity and flexibility of the film are shown in Table 1.

EXAMPLE 2

Using the monomers shown in Table 1, the copolymerization was conducted by using the same catalyst and operation as those of Example 1. The resultant polyether copolymer (1 g), triethylene glycol dimethacrylate (0.05 g) and benzoyl oxide (0.015 g) as a crosslinking agent were dissolved in acetonitrile (20 ml), and the resultant solution was mixed with lithium bistrifluoromethanesulfonylimide (electrolyte salt compound) so that a molar ratio of (the number of moles of the electrolyte salt compound to the total number of moles of ether oxygen atoms of copolymer) was 0.05. This mixture solution was heated under a nitrogen atmosphere at 100° C. for 3 hours to give a film. The measurement results of the conductivity and flexibility of the film are shown in Table 1.

EXAMPLE 3

Using the monomers shown in Table 1, the copolymerization was conducted by using the same catalyst and operation as those of Example 1. The resultant polyether copolymer (1 g), triethylene glycol diacrylate (0.05 g) and 2,2-dimethoxy-1,2-diphenylethan-1-one (0.02 g) as a sensitizing agent were dissolved in acetonitrile (5 ml), and the resultant solution was mixed with lithium perchlorate (electrolyte salt compound) so that a molar ratio of (the number of moles of the electrolyte salt compound to the total number of moles of ether oxygen atoms of copolymer) was 0.05. This mixture solution was cast on a mold made of polytetrafluoroethylene, dried and then exposed to ultraviolet radiation (30 mW/cm$^2$, 360 nm) under an argon atmosphere at 59° C. for 10 minutes to give a film. The measurement results of the conductivity and flexibility of the film are shown in Table 1.

EXAMPLE 4

Using the monomers shown in Table 1, the copolymerization was conducted by using the same catalyst and operation as those of Example 1. The resultant polyether copolymer (1 g) and dibutyltin dilaurate (5 mg) as a catalyst were dissolved in tetrahydrofuran (20 ml) and water (10 μl) was added, followed by stirring for 15 minutes. After the solvent was removed under normal pressure, the mixture solution was dried at 60° C. for 10 hours to give a crosslinked material. The resultant crosslinked material was impregnated with a tetrahydrofuran solution (5 ml) containing lithium perchlorate (100 mg) for 20 hours, heated at 170° C. under 80 kgw/cm$^2$ for 10 minutes and pressurized to give a film. The measurement results of the conductivity and flexibility of the film are shown in Table 1.

EXAMPLE 5

Using the monomers shown in Table 1, the copolymerization was conducted by using the same catalyst and operation as those of Example 1. The resultant polyether copolymer (1 g) and maleic anhydride (150 mg) were dissolved in acetonitrile (10 ml), and the resultant solution was mixed with a solution of lithium perchlorate (electrolyte salt compound) in tetrahydrofiiran so that a molar ratio of (the number of moles of the soluble electrolyte salt compound to the total number of moles of ether oxygen atoms of copolymer) was 0.05. This mixture solution was cast on a old made of polytetrafluoroethylene, dried and then heated at 150° C. under 20 Kgw/cm$^2$ for one hour and pressurized to give a film. The measurement results of the. onductivity and flexibility of the film are shown in Table 1.

EXAMPLE 6

Using the monomers shown in Table 1, the copolymerization was carried out by using the same catalyst and operation as those of Example 1. The resultant polyether copolymer (1 g) and diethylenetriamine (50 mg) were dissolved in tetrahydrofuran (20 ml), and the reaction was conducted at 40° C. for 2 hours. After the solvent was removed under reduced pressure, the mixture solution was dried at 60° C. for 6 hours to give a crosslinked material. The resultant crosslinked material was impregnated with a tetrahydrofuran solution (5 ml) containing lithium perchlorate (100 mg) for 20 hours, heated at 160° C. under 100 kgw/cm$^2$ for 10 minutes and pressurized to give a film. The measurement results of the conductivity and flexibility of the film are shown in Table 1.

TABLE 1

COPOLYMER AND SOLID POLYMER ELECTROLYTE

| | EXAMPLES | | | | |
|---|---|---|---|---|---|
| | 1 | 2 | 3 | 4 | 5 |
| Material Monomer charged (mol %) | | | | | |
| Ethylene oxide | 70 | 80 | 85 | 90 | 82 |
| Propylene oxide | 27 | 19 | 13 | 9.97 | 10 |
| Allyl glycidyl ether | 3 | 1 | | | |
| Glycidyl methacrylate | | | 2 | | |
| 3-glycidoxypropyltrimethoxy silane | | | | 0.03 | |
| 2,3-epoxypropyl-2',3'-epoxy-2'-methylpropyl ether | | | | | 8 |
| Composition of Resulting Copolymer (mol %) | | | | | |
| Ethylene oxide | 73 | 81 | 87 | 92.4 | 83 |
| Propylene oxide | 24 | 18 | 11 | 7.57 | 11 |
| Allyl glycidyl ether | 3 | 1 | | | |
| Glycidyl methacrylate | | | 2 | | |
| 3-glycidoxypropyltrimethoxy silane | | | | 0.03 | |
| 2,3-epoxypropyl-2',3'-epoxy-2'-methylpropyl ether | | | | | 6 |
| Weight-Average Molecular Weight of Copolymer | 1,100,000 | 2,050,000 | 2,400,000 | 3,410,000 | 2,020,000 |
| Glass Transition Temperature of Copolymer (° C.) | −69 | −69 | −68 | −65 | −66 |
| Heat of Fusion of Copolymer (J/g) | 5 | 18 | 43 | 52 | 46 |
| Flexibility of Solid Electrolyte Film | No Breakage | No Breakage | No Breakage | No Breakage | No Breakage |
| Conductivity of Solid Electrolyte Film (S/cm) at 30° C. | $6.1 \times 10^{-5}$ | $9.1 \times 10^{-5}$ | $7.9 \times 10^{-5}$ | $6.8 \times 10^{-5}$ | $1.4 \times 10^{-4}$ |

COMPARATIVE EXAMPLES 1–5

The polyether copolymer shown in Table 2 which was prepared in a manner similar to Example 1 was used.

In Comparative Example 1, the same procedure as that of Example 1 up to the film forming was performed in a manner similar to Example 1 except that only ethylene oxide was polymerized. In Comparative Examples 2 and 5, the film forming was carried out in a manner similar to Example 1. In Comparative Examples 3 and 4, film forming was carried out in a manner similar to Example 2. The results are summarized in Table 2.

(0.025 g), LiBF$_4$ (0.65 g) and acetonitrile (50 ml) were mixed under stirring by using a disperser to prepare a paste. This paste was coated on an aluminum foil and then dried to adhere a cathode material on the aluminum foil. Then, the cathode material was crosslinked by heating at 150° C. for 3 hours in a drier having atmosphere replaced by nitrogen.

(2) Assembling of Battery

A battery was assembled by adhering an Li foil (diameter: 16 mm, thickness: 80 μm) to one main surface of a solid polymer electrolyte film made in Example 2 or 3 and then further the above cathode to the other main surface of the solid polymer electrolyte film. This operation was conducted in a glove box under a dry argon atmosphere.

TABLE 2

COPOLYMER AND SOLID POLYMER ELECTROLYTE

| | COMPARATIVE EXAMPLES | | | | |
|---|---|---|---|---|---|
| | 1 | 2 | 3 | 4 | 5 |
| Composition of Resulting Copolymer (mol %) | | | | | |
| Ethylene oxide | 100 | 11 | 74 | 50 | 30 |
| Propylene oxide | | 89 | 23 | 48 | 69.9 |
| Allyl glycidyl ether | | | 3 | 2 | |
| 3-glycidoxypropyltriethoxy silane | | | | | 0.1 |
| Weight-Average Molecular Weight of Copolymer | 4,200,000 | 680,000 | 10,000 | 860,000 | 730,000 |
| Glass Transition Temperature of Copolymer (° C.) | −57 | −65 | −67 | −67 | −65 |
| Heat of Fusion of Copolymer (J/g) | 179 | 0 | 4 | 0 | 0 |
| Flexibility of Solid Electrolyte Film | Breakage Observed | No Breakage | Breakage Observed | No Breakage | No Breakage |
| Conductivity of Solid Electrolyte Film (S/cm) at 30° C. | $5.8 \times 10^{-7}$ | $1.3 \times 10^{-6}$ | $9.2 \times 10^{-6}$ | $9.8 \times 10^{-7}$ | $9.8 \times 10^{-6}$ |

It is apparent from a comparison of Examples with Comparative Examples that the ionic conductivity and mechanical properties of the crosslinked solid polymer electrolyte formed from the polyether copolymer of the present invention are excellent.

EXAMPLE 7

(1) Production of Cathode (Positive Electrode)

LiCoO$_2$ powder (10 g), graphite (KS-15) (7.5 g), the copolymer obtained in Example 3 (7.5 g), dicumyl peroxide (3) Charge/Discharge Test The resultant battery was charged up to 4.2 V at a temperature of 50° C. and a current density of 0.1 mA/cm$^2$, and discharged up to 3.0 V. A discharge capacity of 131 mAh per 1 g of LiCoO$_2$ as an active substance was obtained. The solid polymer electrolyte films of copolymers of Examples 2 and 3 gave the same results.

EXAMPLE 8

1) The Cathode was Prepared in the Same Manner as Example 7.

2) Assembly of the Battery 1.6 g of the polyether copolymer obtained in Example 2, 0.4 g of a branched polyether (a plasticizer) represented by formula (i):

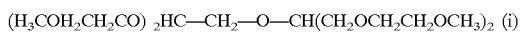

and 0.02 g of benzoyl peroxide as a crosslinking agent were dissolved in 5 ml of acetonitrile, and then lithium perchlorate was added thereto so that the molar ratio of (the number of moles of soluble electrolyte salt compound)/(the total number of moles of ether oxygen atom in the copolymer) was 0.06. This mixture liquid was cast on a mold made from polytetrafluoroethylene, dried, and then heated in nitrogen atmosphere for 3 hours at 100° C., to obtain a film. The cathode described above, the solid polymer electrolyte film and a Li foil (diameter: 16 mm, thickness: 80 μm) were adhered to assemble a battery. All the operations were carried out in a glove box having a dried argon atmosphere.

3) Charging/Discharging Test

At The resultant battery was charged up to 4.2 V at a temperature of 23° C. and a current density of 0.1 mA/cm$^2$, and discharged up to 3.0 V. A discharge capacity of 130 mAh per 1 g of LiCoO$_2$ as an active substance was observed.

EFFECT OF THE INVENTION

The crosslinked solid polymer electrolyte of the present invention is superior in processability, moldability, mechanical strength, flexibility, heat resistance, etc., and the ionic conductivity is remarkably improved. Accordingly, the crosslinked solid polymer electrolyte of the present invention has an application to electronic apparatuses such as large-capacity capacitor and display device (e.g. electrochromic display) in addition to solid batteries, and an application to antistatic agent for plastic materials.

What is claimed is:

1. A solid polymer electrolyte comprising: (I) a crosslinked material of a polyether copolymer; (II) an electrolyte salt compound; and (III) a plasticizer which may be added if necessary and is selected from the group consisting of an aprotic organic solvent, a derivative or a metal salt of a linear or branched polyalkylene glycol, and a metal salt of said derivative, wherein the polyether copolymer having a weight-average molecular weight of 10$^5$ to 10$^7$, comprises as a main chain:

A) 3 to 30% by mol of a repeating unit (I'), derived from propylene oxide;

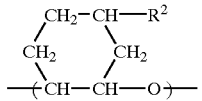

B) 96 to 69% by mol of a repeating unit (II'), derived from ethylene oxide; and

C) 0.01 to 15% by mol of a repeating unit (III'-1) and/or (III'-2), derived from a crosslinkably reactive monomer;

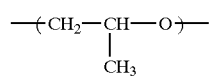

wherein R$^1$ and R$^2$ are groups each having a reactive functional group.

2. The solid polymer electrolyte according to claim 1, wherein the reactive functional group in the repeating unit (C) is (a) an ethylenically unsaturated group, (b) a reactive silicon group, (c) an epoxy group or (d) a halogen atom.

3. The solid polymer electrolyte according to claim 2, wherein the monomer having the ethylenicallyunsaturated groupwhichconstitutes the repeating unit (C) is selected from the group consisting of allyl glycidyl ether, 4-vinylcyclohexyl glycidyl ether, α-terpenyl glycidyl ether, cyclohexenyl methyl glycidyl ether, p-vinylbenzyl glycidyl ether, allyl phenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate and glycidyl-4-hexenoate.

4. The solid polymer electrolyte according to claim 2, wherein the monomer having the reactive silicon group which constitutes the repeating unit (C) is selected from the group consisting of 3-glycidoxy propyl trimethoxy silane, 3-glycidoxypropyl methyl dimethoxy silane, 4-(1,2-epoxy) butyl trimethoxy silane and 2-(3,4-epoxycyclohexyl) ethyl trimethoxy silane.

5. The solid polymer electrolyte according to claim 2, wherein the monomer having two epoxy groups which constitutes the repeating unit (C) is 2,3-epoxypropyl-2',3'-epoxy-2'-methylpropyl ether or ethyleneglycol-2,3-epoxypropyl-2',3'-epoxy-2'-methylpropyl ether.

6. The solid polymer electrolyte according to claim 2, wherein the monomer having the halogen atom which constitutes the repeating unit (C) is selected from the group consisting of epichlorohydrin, epibromohydrin and epi-iodohydrin.

7. The solid polymer electrolyte according to claim 2, wherein the polyether copolymer comprises: 5 to 25% by mol of the repeating unit (A); 94 to 74% by mol of the repeating unit (B); and 0.01 to 10% by mol of the repeating unit (C).

8. The solid polymer electrolyte according to claim 1, wherein the electrolyte salt compound (II) is a compound composed of a cation selected from metal cation, ammonium ion, amidinium ion and guanidium ion, and an anion selected from chloride ion, bromide ion, iodide ion, perchlorate ion, thiocyanate ion, tetrafluoroborate ion, nitrate ion, AsF$_6^-$, PF$_6^-$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, X$^1$SO$_3^-$, [(X$^1$SO$_2$)(X$^2$SO$_2$)N]$^+$, [(X$^1$SO$_2$)(X$^2$SO$_2$) (X$^3$SO$_2$)C]$^+$ and [(X$^1$SO$_2$)(X$^2$SO$_2$) YC]$^+$ (wherein X$^1$, X$^2$, X$^3$ and Y respectively represent an electron attractive group).

9. The solid polymer electrolyte according to claim 8, wherein X$^1$, X$^2$ and X$^3$ independently represent a perfluoroalkyl group having 1 to 6 carbon atoms or a perfluoroaryl group having 6 to 20 carbon atoms, and Y represents a nitro group, a nitroso group, a carbonyl group, a carboxyl group or a cyano group.

10. The solid polymer electrolyte according to claim 8, wherein the metal cation is a cation of a metal selected from Li, Na, K, Rb, Cs, Mg, Ca, Ba, Mn, Fe, Co, Ni, Cu, Zn and Ag.

11. The solid polymer electrolyte according to claim 1, wherein the aprotic organic solvent is an aprotic organic solvent selected from ethers or esters.

12. The solid polymer electrolyte according to claim 1, wherein the polyalkylene glycol is polyethylene glycol or polypropylene glycol.

13. The solid polymer electrolyte according to claim 1, wherein the derivative of the polyalkylene glycol is an ether derivative or an ester derivative.

14. The solid polymer electrolyte according to claim 1, wherein the metal salt of the polyalkylene glycol is selected from the group consisting of a sodium salt of the polyalkylene glycol, a lithium salt of the polyalkylene glycol, and a dialkyl aluminum salt of the polyalkylene glycol.

15. A battery comprising:

a solid polymer electrolyte according to claim 1;

a positive electrode; and a negative electrode.

* * * * *